United States Patent
Tschekalinskij et al.

(10) Patent No.: US 8,300,307 B2
(45) Date of Patent: Oct. 30, 2012

(54) CONCEPT FOR DETECTING IMAGES WITH SUB-WAVELENGTH RESOLUTION

(75) Inventors: Wladimir Tschekalinskij, Nuernberg (DE); Stephan Junger, Bubenreuth (DE); Norbert Weber, Weissenohe (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 535 days.

(21) Appl. No.: 12/594,566

(22) PCT Filed: Apr. 7, 2008

(86) PCT No.: PCT/EP2008/002738
§ 371 (c)(1),
(2), (4) Date: Dec. 1, 2009

(87) PCT Pub. No.: WO2008/122430
PCT Pub. Date: Oct. 16, 2008

(65) Prior Publication Data
US 2010/0072353 A1 Mar. 25, 2010

(30) Foreign Application Priority Data
Apr. 5, 2007 (DE) .......................... 10 2007 016 588

(51) Int. Cl.
*G02B 21/00* (2006.01)
(52) U.S. Cl. ..................................................... 359/368
(58) Field of Classification Search .................. 359/368
See application file for complete search history.

(56) References Cited

U.S. PATENT DOCUMENTS

| | | | |
|---|---|---|---|
| 6,998,660 B2 | 2/2006 | Lyon et al. | |
| 7,129,982 B1 | 10/2006 | Assadi | |
| 7,499,221 B2 | 3/2009 | Nishioka et al. | |
| 7,760,364 B1 * | 7/2010 | Zhuang et al. | 356/502 |
| 8,045,253 B2 * | 10/2011 | Li et al. | 359/245 |
| 8,129,687 B2 * | 3/2012 | Fukuyama | 250/368 |
| 2005/0192217 A1 | 9/2005 | Muhlradt et al. | |
| 2005/0212045 A1 | 9/2005 | Tamai | |
| 2005/0233493 A1 | 10/2005 | Augusto | |

(Continued)

FOREIGN PATENT DOCUMENTS

JP 2006-138633 6/2006

(Continued)

OTHER PUBLICATIONS

H. G. Frey: Eine hochauflösende optische Nahfeld-Sonde für Fluoreszenzmessungen an biologischen Proben, Dissertation filed on Feb. 12, 2004 at the Technical University Munich, relevant pp. 3-16 and 38-49.

(Continued)

*Primary Examiner* — Mark Consilvio
(74) *Attorney, Agent, or Firm* — Glenn Patent Group; Michael A. Glenn

(57) ABSTRACT

A microscope with sub-wavelength resolution with a light source for monochromatic light with a predetermined wavelength, an object carrier for an object to be examined, and an image sensor with an optical structure with a first side and a second side opposite to the first side, the optical structure having a negative refractive index, and a pixel array extending along the second side of the optical structure at a predetermined distance, wherein the first side of the optical structure of the image sensor is arranged at a near-field distance smaller than the wavelength of the monochromatic light to the object carrier.

19 Claims, 16 Drawing Sheets

U.S. PATENT DOCUMENTS

| | | | |
|---|---|---|---|
| 2005/0237384 A1 | 10/2005 | Jess et al. | |
| 2005/0263675 A1 | 12/2005 | Mouli | |
| 2006/0006485 A1* | 1/2006 | Mouli | 257/432 |
| 2006/0146376 A1 | 7/2006 | Kim | |
| 2006/0192217 A1 | 8/2006 | David | |
| 2010/0072353 A1* | 3/2010 | Tschekalinskij et al. | 250/234 |
| 2010/0134898 A1* | 6/2010 | Shalaev et al. | 359/665 |
| 2010/0165134 A1* | 7/2010 | Dowski et al. | 348/218.1 |
| 2010/0253828 A1* | 10/2010 | Yamada | 348/340 |
| 2011/0187577 A1* | 8/2011 | Fuller et al. | 342/22 |
| 2011/0250406 A1* | 10/2011 | Zia | 428/174 |
| 2011/0321204 A1* | 12/2011 | Karaki et al. | 850/32 |

FOREIGN PATENT DOCUMENTS

| | | |
|---|---|---|
| JP | 2006-145985 | 6/2006 |
| JP | 2006-215479 | 8/2006 |
| WO | 2006/055798 A1 | 5/2006 |

OTHER PUBLICATIONS

H. Lee et al.: Realization of optical superlens imaging below the diffraction limit, Dec. 19, 2005; New Journal of Physics 7 (2005) 255, pp. 1-16, IOP Publishing Ltd and Deutsche Physikalische Gesellschaft.

W. Cai et al.: "Superlens based on metal-dielectric composites", Nov. 1, 2005; Physical Review B 72, pp. 193101-1 through 193101-4, The American Physical Society.

G. Shvets: "Band engineering using electrostatic resonance applications to super-lensing", University of Texas, Plasmonic Nanophotonics Session, 35th Winter Colloquium on The Physics of Quantum Electronics, Snowbird, UT, Jan. 5, 2005; 32 pages.

I.I. Smolyaninov et al.: "Magnifying Superlens in the visible frequency range"; Mar. 23, 2007, Science Magazine, vol. 315, No. 5819, pp. 1699-1701.

K.B. Crozier et al.: "Air-bridged photonic crystal slabs at visible and near-infrared wavelengths"; Mar. 30, 2006; Physical Review B 73, pp. 115126-1 through 115126-14, The American Physical Society.

P. B. Catrysse et al.: "Integrated color pixels in 0.18 µm complementary metal oxide semiconductor technology". Dec. 2003; In: Journal of the Optical Society of America A, vol. 20, No. 12, pp. 2293-2306.

K. L. Kelly et al.: "The Optical Properties of Metal Nanoparticles: The Influence of Size, Shape, and Dielectric Environment", Published on the Web Dec. 21, 2002; J. Phys. Chem. B, vol. 107, No. 3, pp. 668-677, American Chemical Society 2003.

C. Su et al.: "Analysis of focusing effects of 3-D photonic crystal lens by the method of moments", Aug. 7, 2002; IEEE Antennas and Propagation Society Int'l Symposium 2002, ISBN 0-7803-7330-8.

B.-I. Wu et al.: "Analysis of photonic crystal filters by the finite-difference time-domain technique", Oct. 20, 2000; Microwave and optical technology letters, vol. 27, Nr. 2, pp. 81-87.

P. B. Catrysse: "Monolithic Integration of Electronics and Sub-wavelength Metal Optics in Deep Submicron CMOS Technology", Material Research Society Symposium Proceedings, vol. 869, Mar. 28-Apr. 1, 2005, pp. D1.5.1-D1.5.12.

Sievenpiper et al.: "Eliminating surface currents with metallodielectric photonic crystals", Microwave Symposium Digest, 1998 IEEE MTT-S International Baltimore, MD, USA Jun. 7-12, 1998, New York, NY, USA, IEEE, US, vol. 2, Jun. 1998, pp. 663-666.

\* cited by examiner

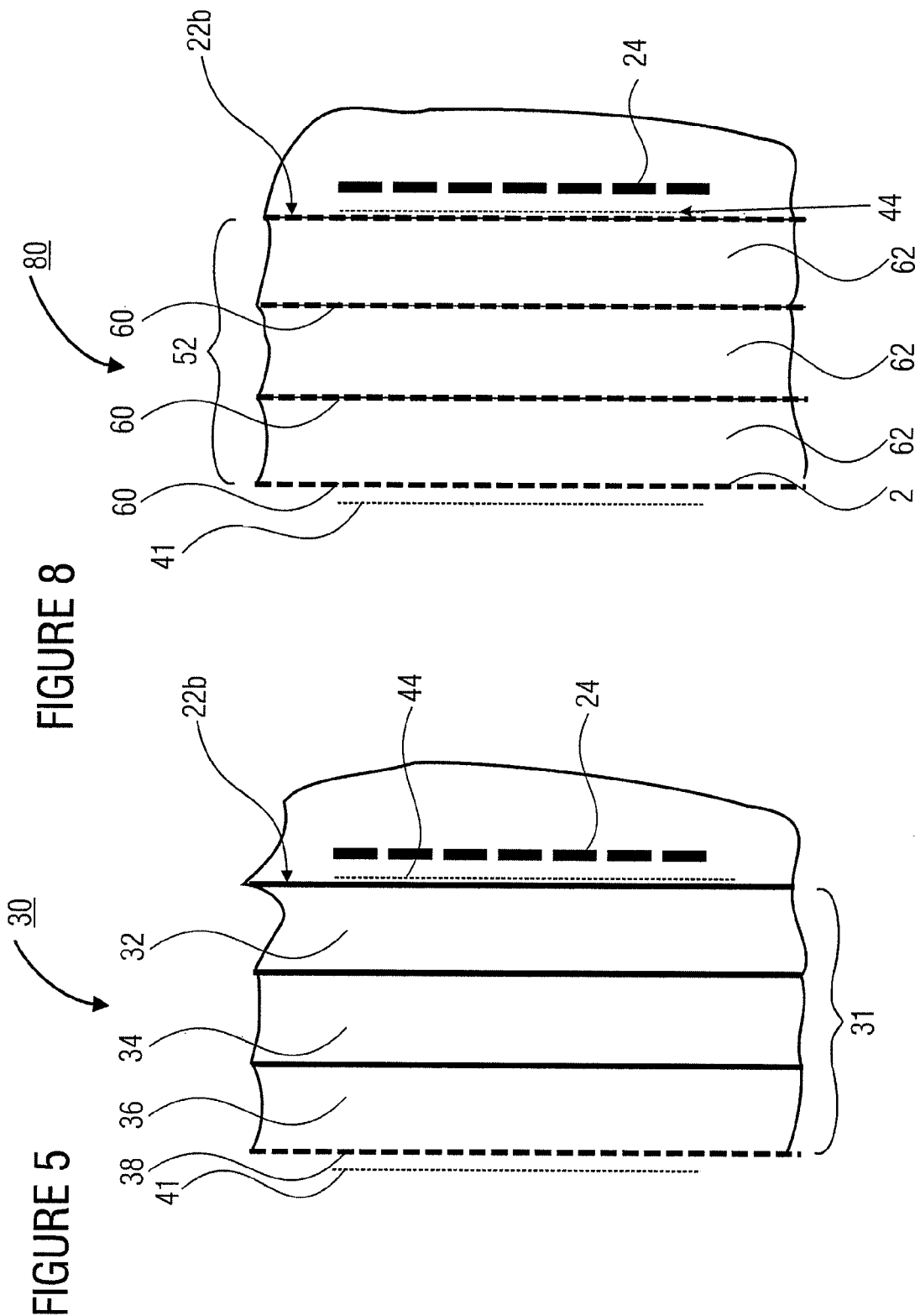

CONCEPT FOR DETECTING IMAGES WITH SUB-WAVELENGTH RESOLUTION

CROSS-REFERENCE TO RELATED APPLICATIONS

This application is a national phase entry of PCT Patent Application Serial No. PCT/EP2008/002738, filed 7 Apr. 2008, which claims priority to German Patent Application No. 10 2007 016 588.0, filed 5 Apr. 2007.

BACKGROUND OF THE INVENTION

The present invention relates to image sensors for detecting images with sub-wavelength resolution, and to methods of manufacturing the same.

As early as some decades ago, the Russian scientist, V. Veselago predicted the existence of materials with negative refractive indices $n=c_0/c=\sqrt{\in_r \mu_r}$ with $c_0$ signifying the speed of light in vacuum, and c the speed of light in a material. Furthermore, $\in_r$ signifies the electric conductivity or permittivity, and $\mu_r$ the magnetic conductivity or permeability of the material. At a negative refractive index n, the Poynting vector $\vec{S}$ points in the opposite direction of the wave vector $\vec{k}$, and the wave vector, the electric field strength $\vec{E}$ and the magnetic field strength $\vec{H}$ form a left-handed tripod. Hence, materials with a negative refractive index are also referred to as so-called left-handed materials. The opposite directions of Poynting vector $\vec{S}$ and wave vector $\vec{k}$ result in energy transport against the wave and/or light propagation. At the transition from a left-handed material to a medium with a positive refractive index n, the light is not only refracted toward the perpendicular, but even beyond that.

Such so-called left-handed materials may be obtained when both, negative permittivity $\in_r$ and negative permeability $\mu_r$, are present in a material, so that the refractive index n becomes negative. With such a left-handed material, for example, an ideal lens or a so-called superlens can be constructed. It is characterized in that a point-like source has a point-shaped image, i.e. works completely without diffraction.

A classic optical system, such as shown in FIG. 12, is diffraction-limited.

FIG. 12 shows an objective 10. At a working distance or object-side distance $f_1$ to the objective 10, there is a plane with an object to be imaged, i.e. an object plane 12. An image plane 14 is at an image-side distance or image distance $f_2$ to the objective 10. If an object or the object plane 12 is in an object space having the refractive index n, a maximum resolution between two points having a distance d is obtained at $$d \geq \frac{0,61\lambda}{n \cdot \sin\alpha} \quad (1)$$

with the arrangement shown in FIG. 12, wherein λ signifies the wavelength of the light illuminating the object plane 12, and n sing the numerical aperture of the objective 10.

It can be seen from equation (1) that classically there are two ways of increasing the resolution of the optical system shown in FIG. 12. On the one hand, illumination with light of a shorter wavelength λ, can be chosen, such as with UV light or X-ray light in lithography, or so-called immersion liquids having a refractive index n increased with respect to air can be used in the object space, i.e. in the space to the left of the objective 10. However, even in the case of immersion liquids with a high refractive index n, it is smaller than two, and, hence, the generally achievable resolution lies in the range of about half a wavelength λ/2.

Optical systems with a resolution in the sub-wavelength region, i.e. with resolutions clearly smaller than λ/2, have already been demonstrated in the past. For example, the diffraction limitation described in the foregoing may be bypassed by methods of near-field optics. Common near-field microscopes have a resolution of less than λ/10.

At an observation distance to the objects that is much smaller than the wavelength λ of the light, the classic diffraction theory is no longer valid. Hence, the resolution here can no longer be limited due to diffraction either. This means that one practically bypasses the Rayleigh criterion in near-field microscopes and thus obtains resolutions below λ/2. The area of the light field lying close to an object to be examined is referred to as near field. So as to be able to acquire additional information from the near field, so-called evanescent field components have to be converted to propagating field components. The non-propagating component of the near field is generally referred to as evanescent field. The evanescent field drops exponentially with the surface normal of the radiating body. Thus, every illuminated object produces an evanescent field and a propagating one. For example, a purely evanescent field can be observed in the case of total reflection. If an incident light beam is reflected totally at an interface of an optically denser medium to an optically thinner medium, the field cannot become zero abruptly on the side of the optically thinner medium due to the continuity condition, but drops exponentially into the half-space of the optically thinner medium. In general, the evanescent field has already disappeared at a distance of about λ/2 from the interface of the two optical media. Yet it is exactly this field which contains information on structures below the classic resolution limit.

In order to convert evanescent field components to propagating field components, for example, a scattering center may be introduced into the near field. In this scattering center, dipole oscillations are excited by the evanescent field, so that again evanescent and propagating field components develop as a result of the interaction of the scattering center with the near field of the object. A further possibility is the scan of an object surface with an optical probe having a single-mode fiber, at the end of which there is an aperture having a hole diameter of about 40 nanometers. The light exiting this waveguide impinges on the object plane and thereby changes its evanescent field. A remote receiver and its signal processing register this change in the evanescent field, from which the refractive index n and transmission and reflection coefficients can be calculated. Various methods of measuring the near field are described, for example, in the dissertation "Eine hochauflösende optische Nahfeld-Sonde für Fluoreszenzmessungen an biologischen Proben" by Heinrich Gotthard Frey.

Only in the last few years have the theoretical properties of the left-handed materials, as described in the introductory section, been verified practically in experiments. Optical left-handed structures that image object structures in the sub-wavelength range, so-called superlenses have been realized. These optical structures with a negative refractive index transmit the evanescent field of an illuminated object, which carries information on spatial frequencies (e.g. of structures smaller than the wavelength λ of the light used), and image it from the object plane into the image plane in an almost lossless manner. These left-handed materials reconstruct the evanescent fields of sub-wavelength structures.

Presently, no materials with a negative refractive index or negative permeability $\mu_r$ are known to exist in nature. However, these properties can be achieved artificially with so-called metamaterials or photonic crystals, which have small periodic structures significantly smaller than the illumination wavelength λ, so that the electromagnetic waves only experience effective material properties. Some experiments confirming the theory of left-handed materials are described in the following publications. Hyesog Lee, Yi Xiong, Nicholas Fang, Werayut Srituravanich, Stephane Durant, Muralidhar Ambati, Cheng Sun and Xiang Zhan: "Realization of optical superlens imaging below the diffraction limit", Wenshan Cai, Dentcho A. Genov, and Vladimir M. Shalaev: "Superlens based on metal-dielectric composites", Gnnady Shvets: "Band engineering using electrostatic resonances applications to superlensing".

Images appearing in an enlarged form with superlenses are also known, the publication "Magnifying Superlens in the visible frequency range", e.g. shows theoretical and experimental results.

While the employment of left-handed materials for achieving resolutions in the sub-wavelength range is known, however, suitable image sensors to detect complete two-dimensional images of object samples in the sub-wavelength range are missing at present. In the previously described near-field microscopes, an object sample may only be scanned point-by-point, so that point-by-point two-dimensional scanning of the sample surface is needed in order to obtain a complete image. Moreover, transmitting the evanescent field onto a photoreceiver with the aid of additional optics, such as waveguides or lenses, is relatively problematic. The weak and, with increasing distance, exponentially decaying evanescent field is weakened further through the transmission onto the photoreceiver, which leads to low measurement accuracy. Furthermore, in conventional near-field detection, only static objects can be detected, since either exposing a film-like layer or scanning an object is needed.

SUMMARY

According to an embodiment, a microscope with sub-wavelength resolution may have a light source for monochromatic light with a predetermined wavelength; an object carrier for an object to be examined; and an image sensor having an optical structure with a first side and a second side opposite to the first side, the optical structure having a negative refractive index; and a pixel array extending along the second side of the optical structure at a predetermined distance, wherein the first side of the optical structure of the image sensor is arranged at a near-field distance smaller than the wavelength of the monochromatic light to the object carrier.

According to another embodiment, a method of forming an image of an object may have the steps of illuminating the object, with a first side of an optical structure with a negative refractive index arranged at least at a near-field distance to the object, so that an evanescent field on the first side, which is modulated by the object, is transmitted to a second side of the optical structure opposite to the first side; and detecting the evanescent field on the second side by a pixel array.

According to another embodiment, an optical apparatus for improving resolution of diffraction-limited optics may have diffraction-limited optics; an optical structure with a negative refractive index, wherein a first side of the optical structure is arranged in an image plane of the diffraction-limited optics, and wherein the optical structure has neighboring metal layers with openings, wherein the openings have an opening expansion, and wherein a lateral offset of the openings of neighboring metal layers is smaller than the opening expansion, to achieve solid-angle selectivity of the optical structure; and a pixel array extending at a predetermined distance along a second side of the optical structure opposite the first side.

It is the finding of the present invention that an optical resolution improved with respect to diffraction-limited optics can be achieved by imaging an object onto a pixel array located in an image plane and/or mapping plane of the optical structure by means of an optical structure having a negative refractive index. According to embodiments, to this end, an object to be observed in an object plane is brought into a near-field distance to a first side of the optical structure with a negative refractive index, wherein the object to be observed is illuminated with monochromatic light. The near-field distance between the object and the first side of the optical structure is smaller than the wavelength λ of the monochromatic light, according to embodiments. The evanescent field developing on the object due to the illumination of the object is transmitted from the first side of the optical structure to a second side opposite thereto. In a near-field distance smaller than the wavelength of the monochromatic light, there is the pixel array along the second side of the optical left-handed structure, to detect and then further process the transmitted evanescent field.

According to embodiments, the image sensor with the optical structure with a negative refractive index and the pixel array is produced in a CMOS process. Here, the pixel array comprises a two-dimensional array of PN junction sensors, particularly photodiodes. The individual pixel elements of the pixel array are spaced for the detection of the evanescent field in the sub-wavelength range.

The second side of the optical structure is at a distance smaller than the wavelength, such as smaller than 1.2 μm, maybe smaller than 1 μm, and maybe even smaller than 0.8 μm, from the pixel array. According to embodiments, the optical structure comprises a combination of structured metal layers and dielectric layers, so that a negative refractive index for the wavelength of the monochromatic light and/or the illumination wavelength is achieved by the structuring. The combination of the structured metal layers and the dielectric layers can be formed so that the optical left-handed structure is a metamaterial or a photonic crystal.

Subsequently, it will be assumed that a metamaterial is formed from a layer stack of various dielectric materials, wherein a metal layer with microapertures is placed on a topmost dielectric layer. Here, a structured opening with dimensions smaller than the illumination wavelength is to be understood by a microaperture.

Subsequently, a structure substantially having the features of a photonic crystal shall be referred to as a photonic crystal. In particular, what is meant is structures comprising periodic (metallic) structures with dimensions smaller than the illumination wavelength in a dielectric material. Hence, they exhibit unique optical properties, such as solid angle selectivity and spectral selectivity.

Advantageously, the optical structure includes at least a bottom-most CMOS metal layer (CMOS metal 1 layer) closest to the pixel array, in which the microapertures are structured, and/or a metal layer in which, apart from the microapertures, metallic, electric connections or traces are structured between circuit elements (e.g. transistors) of the integrated image sensor. Thickness of a CMOS metal layer lies in a range greater than or equal to 90 nm, in embodiments.

It is an advantage of an image sensor according to embodiments that it allows for resolution and detection of structures much smaller than the illumination wavelength λ. An image sensor according to embodiments may, for example, be applied to concurrently detect, and convert to an electric video signal, the entire image of an object to be examined in a microscope with sub-wavelength resolutions. A microscope with sub-wavelength resolutions according to embodiments does not require an objective, because imaging objects is already integrated in an image sensor according to embodiments. It is possible to amplify, process and digitize an evanescent field converted to an electric signal directly in the sensor.

It is a further advantage of the embodiments of the present invention that a resolution of a diffraction-limited system can be increased. This may be done by attaching an image sensor according to embodiments in an image plane of the diffraction-limited optics. Thereby, structures smaller than about half a wavelength can be resolved. If an image sensor according to embodiments of the present invention is used in combination with a camera with diffraction-limited optics, resolution in the sub-wavelength range can be achieved due to the pronounced angle selectivity of the optical left-handed structures, which leads to separation and/or suppression of spurious diffraction proportions.

BRIEF DESCRIPTION OF THE DRAWINGS

Embodiments of the present invention will be detailed subsequently referring to the appended drawings, in which:

FIG. 5 is a side view of an image sensor with metamaterial according to an embodiment of the present invention;

FIG. 6a is a side view of a photonic crystal with a negative refractive index and an object plane and an image plane of the photonic crystal according to an embodiment of the present invention, wherein

FIG. 8 is a side view of an image sensor with a photonic crystal according to an embodiment of the present invention;

FIG. 11b is a schematic illustration of a portion of the illustration of FIG. 11a for illustrating the angle selectivity properties of the photonic crystal in FIG. 11a.

DETAILED DESCRIPTION OF THE INVENTION

Figure 1:
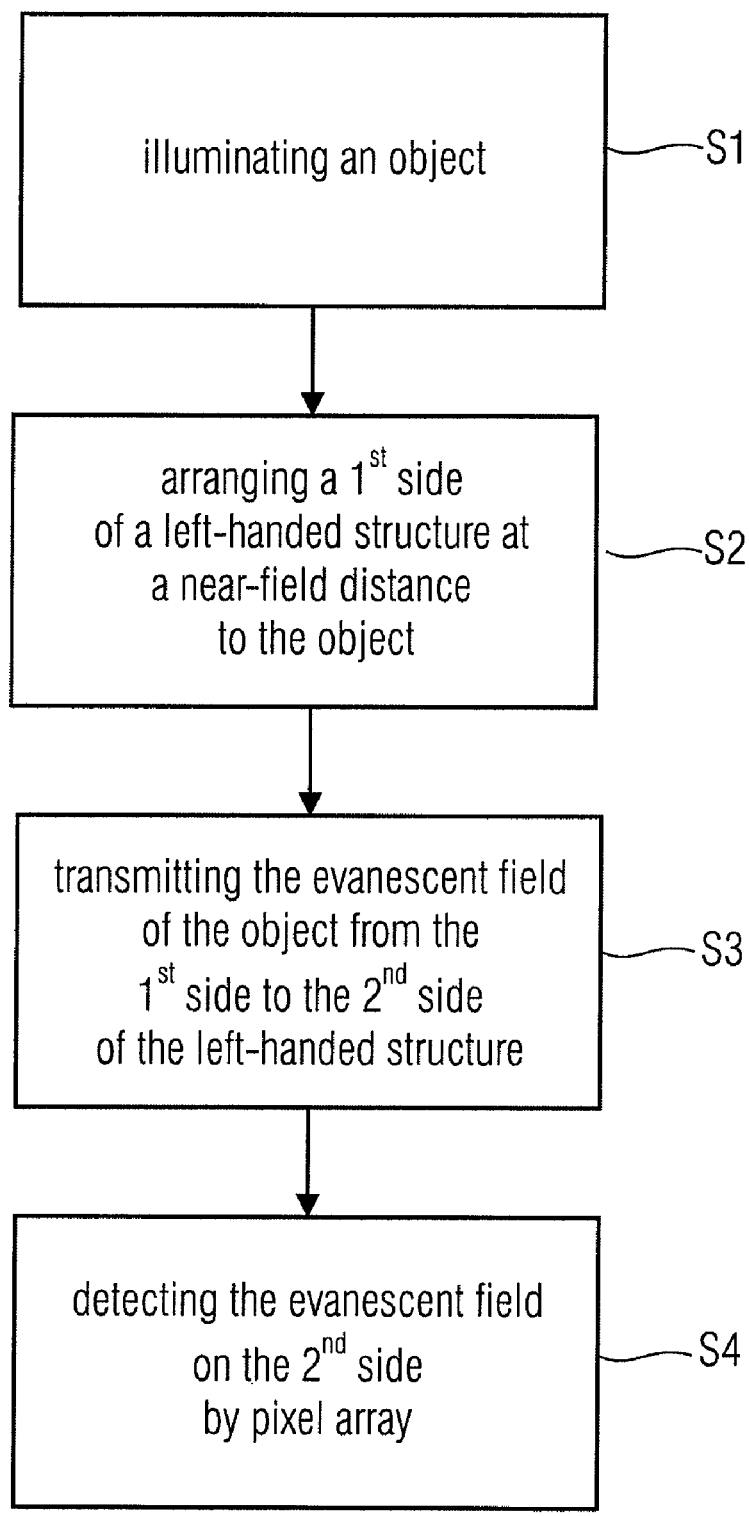
FIG. 1 is a schematic flow chart of a method of generating an image of an object according to an embodiment of the present invention.

With respect to the following description, it is to be noted that the same or similarly acting functional elements in the different embodiments have the same reference numerals, and, hence, the descriptions of these functional elements are mutually interchangeable in the various embodiments illustrated in the following.

FIG. 1 shows a schematic flow chart of a method of generating an image of an illuminated or luminescent object in the sub-wavelength range of the illuminating light.

In a first step S1, the object to be observed or to be examined, which is on an object carrier, is illuminated. According to embodiments, the illumination of the object takes place with monochromatic light having a wavelength $\lambda$ smaller than 1.2 µm, for example.

In a second step S2, a first side of an optical structure with a negative refractive index n is arranged at a near-field distance $d_1$ to the object.

The two steps S1 and S2 may be adjusted to each other in various ways, so that an evanescent light field caused by the illumination of the object on the object side on the first side of the optical structure can reach the opposite second side of the optical structure in a subsequent step still to be discussed. In the following, three possibilities will be illustrated in greater detail with respect to FIGS. 4a to 4c, which is why they are dealt with only very briefly at this point.

For example, a first possibility consists in arranging an interface from an optically denser to an optically thinner medium, such as a prism face, close to the front side of the optical structure, and performing illumination of the prism face from the optically denser medium at an angle with respect to the prism face at which total reflection develops at the prism interface. Under these conditions, an evanescent field illuminating an object to be examined between the prism interface and the front side forms in the optically thinner medium between the prism interface and the front side of the optical structure. So that the evanescent field modulated in phase or amplitude by the object can reach the first side of the optical structure with a negative refractive index n, a distance $d_1$ between the object and the first side of the optical structure that advantageously is smaller than the wavelength of, for example, the monochromatic light used for the illumination can be used, such as a distance smaller than 1.2 µm.

For example, a second possibility may be that the object is in optical contact with the front side of the optical structure, i.e., for example, touches same, and is illuminated from the side facing away from the optical structure. In this case, an evanescent field develops at sub-wavelength openings on the front side of the optical structure. Amplitude and phase of the evanescent field developing at a respective one of the sub-wavelength openings depend on electric and/or magnetic permeabilities of the object the latter has at the local and/or lateral location that presently is in optical contact with the respective opening.

For example, a third possibility is that the object is arranged in a near-field with respect to the front side of the optical structure, while it is illuminated from the side facing away from the optical structure, for example obliquely, wherein, in this case, an evanescent field develops on a side of the object facing the optical structure, for example, when reaching the sub-wavelength openings on the front side of the optical structure and being filtered out from the far-field thereby. So that the evanescent field from the object can reach the first side of the optical structure with a negative refractive index n, a distance between the object and the first side of the optical structure, which advantageously is smaller than the wavelength of, for example, the monochromatic light used for illumination, can be used, such as a distance smaller than 1.2 µm.

In a third step S3, the evanescent field of the object, which has reached the first side of the optical structure and/or develops there, is transmitted from the first side to a second side of the optical structure. Transmission of the evanescent field is possible through the use of an optical material with a negative refractive index in a wavelength range of interest. Hence, the evanescent field can propagate from the first side to the second side of the optical structure.

In a fourth step S4, the evanescent field on the second side of the optical structure is detected by a pixel array. Here, the pixel array is arranged along the second side of the optical structure at a distance $d_2$, which advantageously is smaller than the wavelength of the illuminating light, i.e. $d_2 < \lambda$. As already mentioned at the beginning, an evanescent field of an object decays relatively quickly, hence its name. This is the reason for the fact that, for near-field detection, both the first distance $d_1$ and the second distance $d_2$ should be chosen smaller than the illumination wavelength $\lambda$ each.

Thus, FIG. 1 describes a method of generating an image of an object, with a step of illuminating the object, while arranging a first side of an optical structure with a negative refractive index at a near-field distance to the object, so that an evanescent field from the object reaches the first side, and the evanescent field is transmitted from the first side to a second side opposite to the first side of the optical structure, and a step of detecting the evanescent field on the second side by a pixel array.

Figure 2:
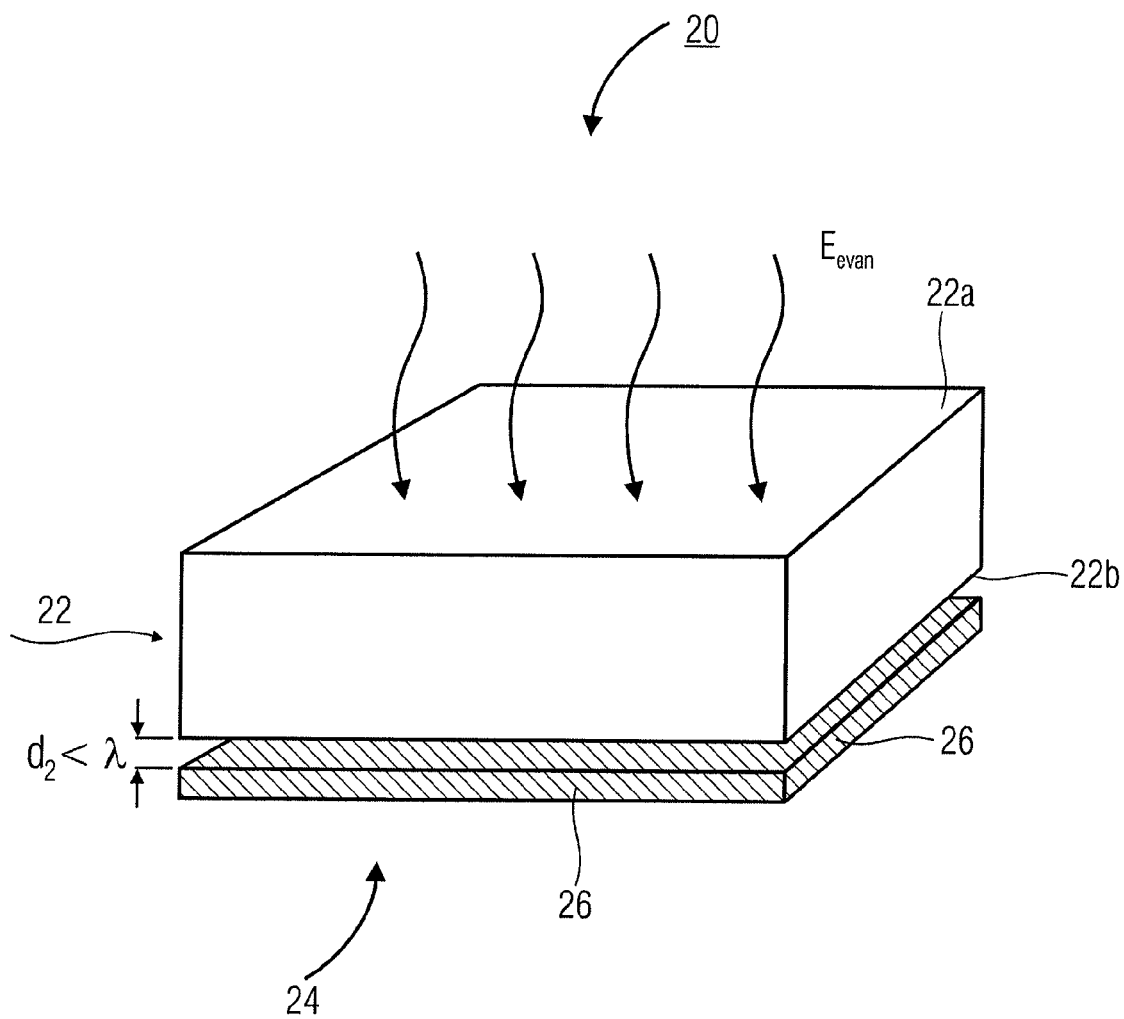
FIG. 2 is a perspective illustration of an image sensor according to an embodiment of the present invention.

FIG. 2 shows an image sensor 20 according to an embodiment of the present invention for performing the method described on the basis of FIG. 1.

The image sensor 20 comprises an optical structure 22 with a first side 22a and a second side 22b opposite to the first side. The optical structure 22 has a negative refractive index n, i.e. n<0. Furthermore, the image sensor 20 includes a pixel array 24 extending along the second side 22b at a predetermined distance $d_2$.

The optical structure 22, which may also be referred to as a left-handed structure, is formed to transmit an evanescent light field $E_{Evan}$ from the first side 22a to the second side 22b of the optical structure 22, according to embodiments. The pixel array 24 is formed to detect a two-dimensional image and, to this end, comprises (X·Y) sensor elements 26 so as to be able to represent a two-dimensional image by X·Y image points, according to embodiments. The sensor elements 26 are formed as PN junction sensors, according to embodiments. Here, a PN junction sensor means a sensor with a PN junction realized by way of different doping. According to embodiments, the PN junction sensors 26 are formed as photodiodes. This means that the pixel area 24 is a photodiode array, according to embodiments.

Adjacent sensor elements 26 of the pixel array 24 each are arranged at a distance smaller than the illumination wavelength $\lambda$, according to embodiments, so as to be able to detect images of an object to be examined in the sub-wavelength range. However, the optical structure may also comprise magnifying properties, which allow for increasing the pixel size, such as due to the higher refractive index of the material between the optical structure and the sensitive face of the pixel sensor, wherein reference is made here to the article "magnifying superlenses in the visible frequency range" by Smolyaninov, Hung and Davis in Science, 315, Mar. 23, 2007, pages 1699-1701.

The predetermined distance $d_2$ of the pixel array from the second side 22b of the optical structure 22, according to embodiments, is adjusted such that an evanescent field transmitted from the first side 22a to the second side 22b and exiting from the second side 22b can be detected by the pixel array 24. For example, illumination wavelengths smaller than 1.2 μm are used, for example, together with CMOS pixel sensors. In this case, the distance $d_2$, for example, would also be chosen so as to be smaller than 1.2 μm. In other embodiments, the distance $d_2$ is smaller than 1 μm or even smaller than 0.8 μM.

Furthermore, an optical structure with a negative refractive index, i.e. a left-handed material, can be constructed by means of a so-called metamaterial. A metamaterial here is a composite material, the electromagnetic material properties of which depend on its structure, instead of the specific properties of the material or the materials of which it consists. In the following, it will be assumed that a metamaterial is formed of a layer stack with a sandwich structure out of several dielectric layers, which have suitable dielectric constants and layer thicknesses, wherein a metal layer with microapertures is placed on a topmost dielectric layer. Here, microaperture is to mean a structured opening with dimensions smaller than the illumination wavelength.

Figure 3:
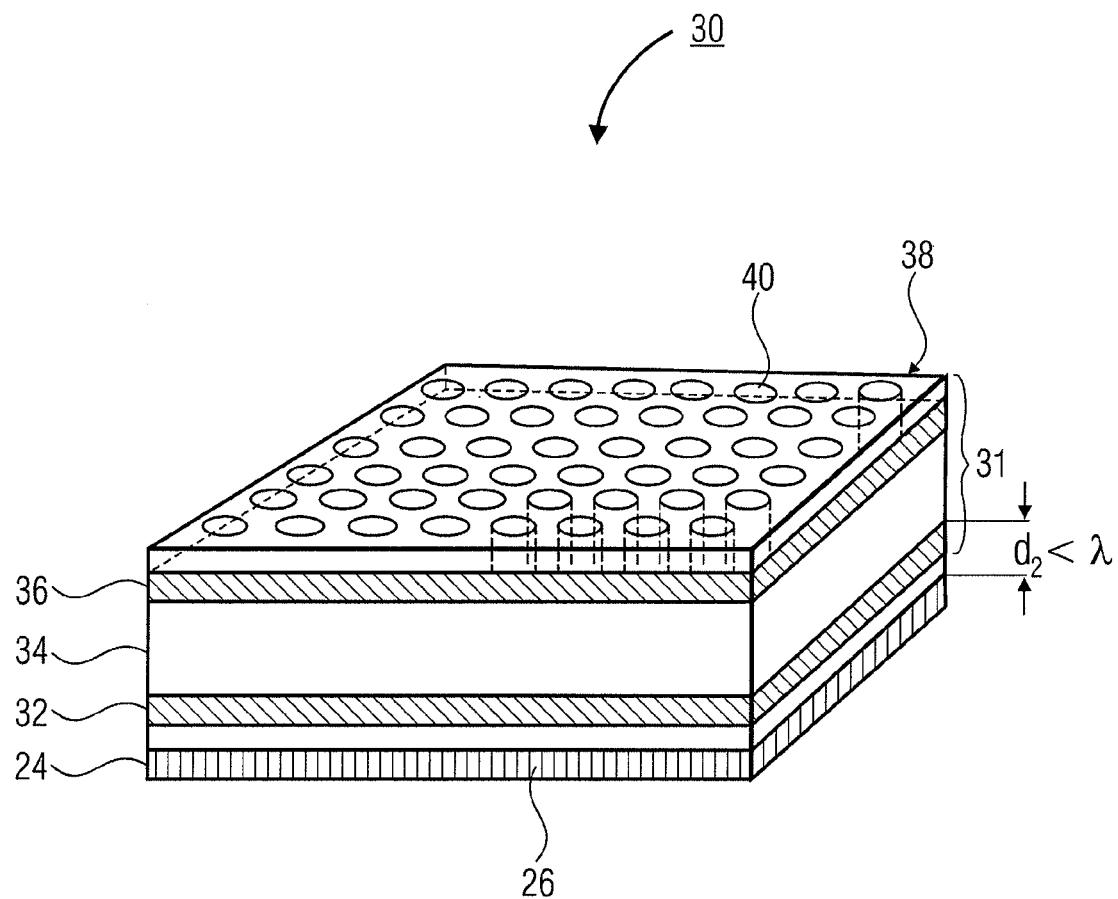
FIG. 3 is a perspective illustration of an image sensor according to a further embodiment of the present invention.

An image sensor 30 according to an embodiment with a metamaterial thus constructed is shown in FIG. 3.

The image sensor 30 in FIG. 3 comprises an optical structure from a layer stack 31 at a distance $d_2 < \lambda$ from the pixel array 24. The layer stack includes a first dielectric layer 32, which forms the second side of the optical structure 31, a second dielectric layer 34 and a third dielectric layer 36. Furthermore, the layer stack 31 includes a metal layer 38, in which there are microapertures 40, on the third dielectric layer 36. For example, the microapertures 40 are circular microopenings. In general, a size or diameter of the microapertures or microopenings 40 and a distance of two adjacent microapertures 40 with respect to each other lies in the subwave range. This means that both, diameters of the microapertures 40 and distances of two adjacent microapertures 40, are smaller than the illumination wavelength, i.e. smaller than 1.2 μm, for example.

The metal of the metal layer 38 is metals used in CMOS processes, for example, such as aluminum or copper. Furthermore, it is to be pointed out here that the microapertures illustrated as circular in FIG. 3 may also be other structures, such as rectangles, hexagons, grid lines, or the like in the sub-wavelength range.

According to embodiments, the sandwich structure of the first dielectric layer 32, the second dielectric layer 34 and the third dielectric layer 36 is a $SiO_2/SiC/SiO_2$ structure, on which there is the metal layer 38. This means that both, the first dielectric layer 32 and the third dielectric layer 36, are $SiO_2$ (silicon dioxide) layers. The dielectric layer 34 is a SiC (silicon carbide) layer. Here, the permittivity $\epsilon_{r,SiC}$ of the SiC layer 34 is approximately equal to the negative permittivities $\epsilon_{r,SiO2}$ of the $SiO_2$ layers 32, 36, i.e. $\epsilon_{r,SiC} = -\epsilon_{r,SiO2}$.

Other dielectric layers 32, 34, 36 with suitable material properties, which lead to a negative refractive index, are also possible, of course.

Figure 4A:
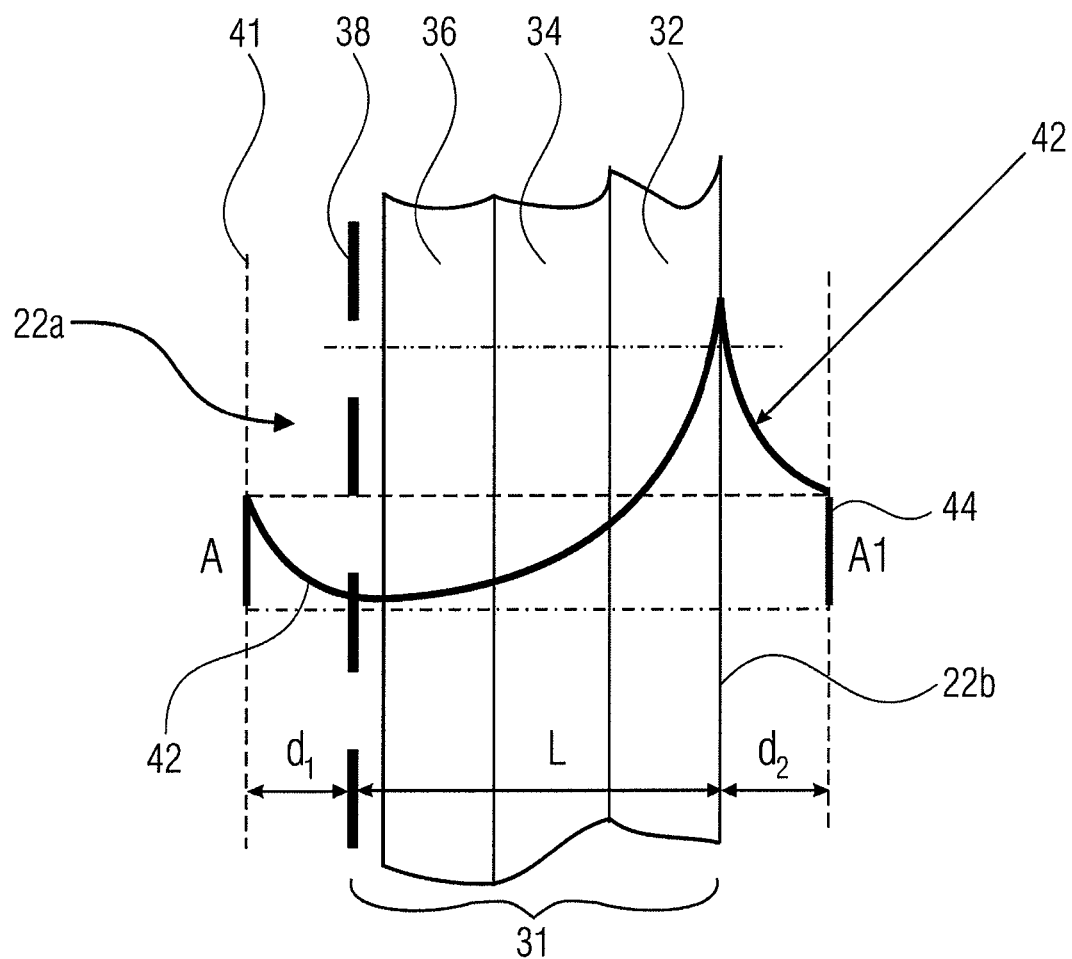
FIGS. 4a to c are side views of a metamaterial with a negative refractive index, showing an object plane, an image plane of the metamaterial, and a course of an evanescent field according to embodiments of the present invention for various evanescent-field generations.

A side view of the metamaterial and/or the layer stack 31 of the dielectric layers 32, 34, 36 and the metal layer 38 is shown in FIG. 4a.

The first side 22a of the optical structure and/or the metamaterial 31, which is formed by the metal layer 38, is at a near-field distance $d_1$ from an object plane 41 in applications of an image sensor according to embodiments, so that an evanescent field 42 originating from the object to be examine reaches the first side 22a and/or the metal layer 38. By way of the special properties of the optical structure 31 (negative refractive index), the evanescent field 42 is amplified upon transmission from the first side to the second side 22b of the optical structure 31, as schematically indicated in FIG. 4a.

Upon exiting on the second side 22b of the optical structure 31 and/or on the interface of the dielectric layer 32, the transmitted evanescent field 42 again decreases quickly. Hence, the plane or image plane 44, where the evanescent field is detected, should not be spaced further than $d_2 < \lambda$ from the second side 22b of the optical structure 31.

As illustrated in FIG. 4a, the field strength of the evanescent field 42 drops exponentially between the object plane 41 and the metal layer 38, and then impinges on the optical structure and/or the superlens 31, which consists of the structured metal layer 38 and the dielectric layers 32, 34, 36. This optical structure 31 transmits the evanescent field 42 to the second side 22b without any losses, where the field strength of the transmitted evanescent field 42 decays again. Hence, the distance $d_2$ between the second side 22b and the image plane 44, where the evanescent field is registered, should be smaller than the illumination wavelength $\lambda$, so that the field strength is not so low.

FIG. 4a thus referred to the above-mentioned third possibility of evanescent field generation, according to which the object 41 is arranged at a near-field distance $d_1$ to the front side 38 of the optical structure 31, while it is illuminated from the side facing away from the optical structure 31, for example obliquely with respect to the front side 38, wherein, in this case, an evanescent field 42 develops on a side 41 of the object facing the optical structure, for example, then reaching the sub-wavelength openings of the front side 38 of the optical structure 31 and being filtered out from the far field by the superlens openings therein.

Figure 4B:
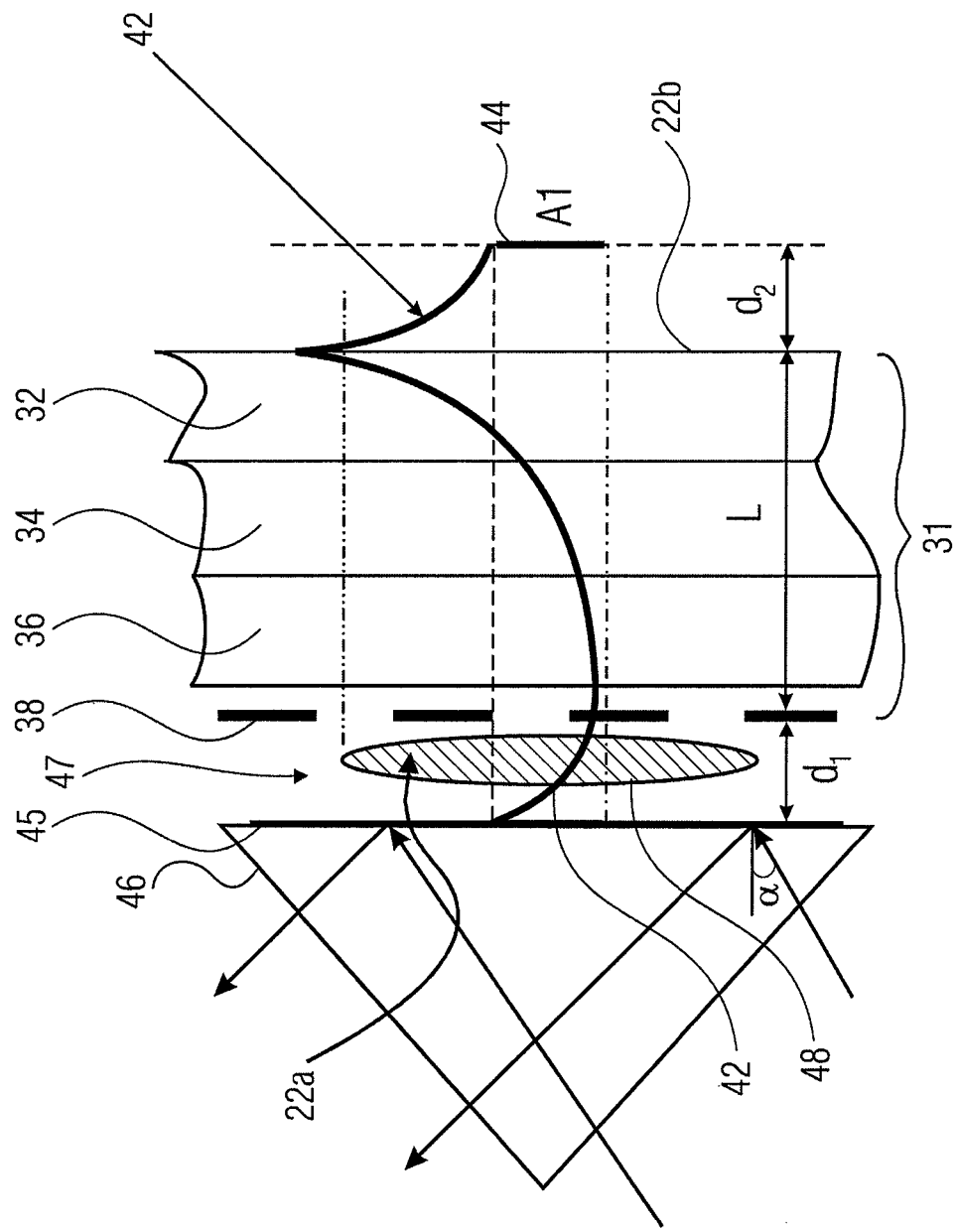

FIG. 4b relates to the previously mentioned first possibility of evanescent field generation, according to which an interface 45 from an optically denser medium, namely a prism 46 here, for example, to an optically thinner medium 47 is arranged near the front side 22a of the optical structure 31, and illumination of the prism face 47 is performed from the optically denser medium at an angle $\alpha$ with respect to the prism face 45 at which total reflection develops at the prism interface 45. Under these conditions, the evanescent field 42, which illuminates an object 48 to be examined between the prism interface 45 and the front side 22a, forms in the optically thinner medium 47 between the prism interface 45 and the front side 22a of the optical structure 31. The evanescent field 42 modulated in phase or amplitude by the object 48 reaches the first side 22a of the optical structure 31 having a negative refractive index n.

Figure 4C:
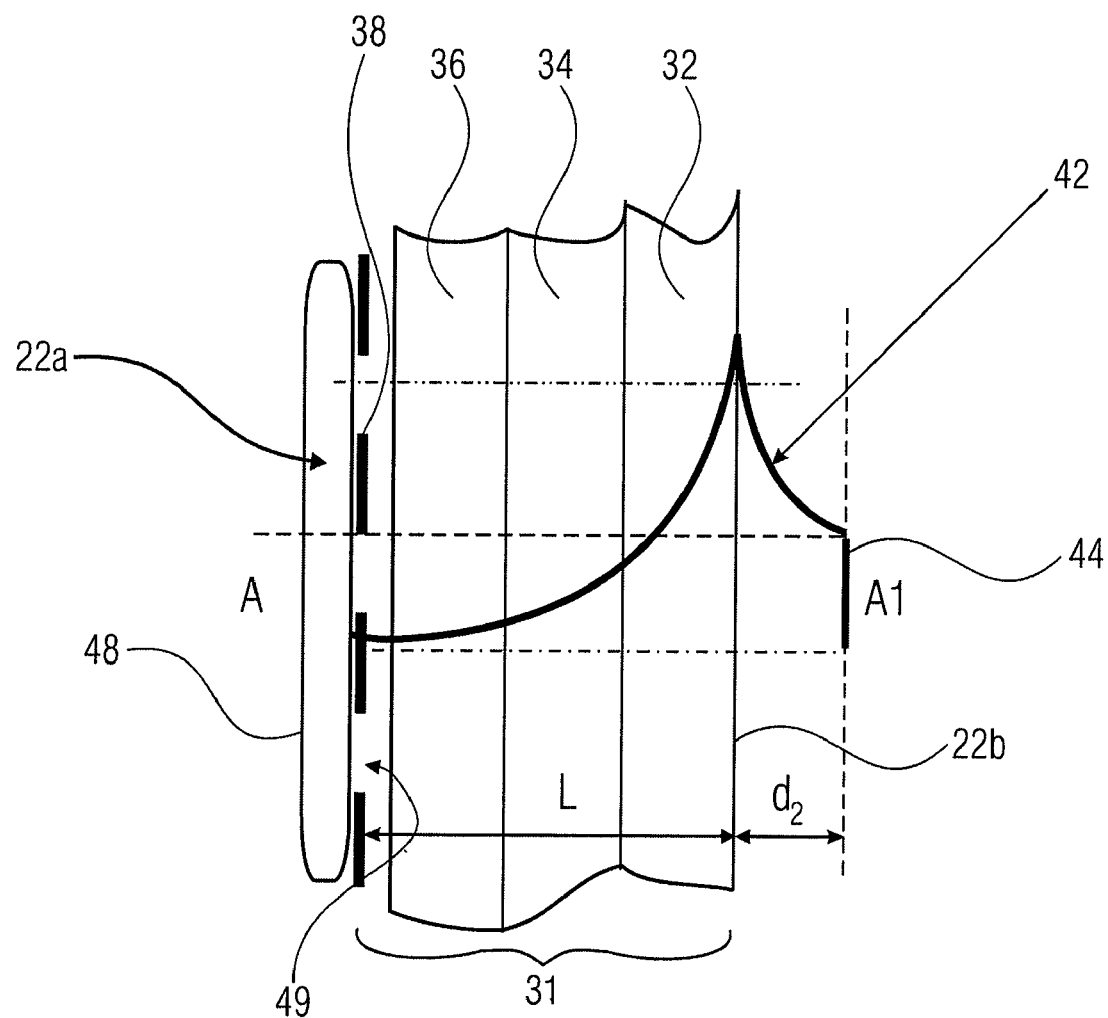

For example, FIG. 4c refers to the previously mentioned second possibility of evanescent-field generation. The object 48 here is in optical contact with the front side 38 of the optical structure 31, such as by way of touching. Illumination takes place from the side facing away from the optical structure 31. In this case, the evanescent field develops at the sub-wavelength openings on the front side 22a of the optical structure 31. Amplitude and phase of the evanescent field, which develops at a respective one of the sub-wavelength openings, depend on electric and/or magnetic permeabilities of the object 48 the latter has at the local and/or lateral location that is presently in optical contact with the respective openings 49.

FIG. 5 shows a side view of the integrated image sensor 30 already shown in FIG. 3. The chip or image sensor 30 includes a structured metal layer 38 and three dielectric layers 32, 34, 36, together forming a material with negative dielectric constant $\in_r$. In FIG. 5, the object plane 41 is very close, i.e. at a near-field distance, to the metal layer 38, the image plane 44 again is very close to the photodiode array 24 and/or the photodiode array 24 is directly in the image plane 44. The photodiode array 24 extends along the second side 22b of the optical structure 31 at a distance $d_2 < \lambda$.

Apart from the metamaterials described, there is a further possibility to produce a left-handed material with a negative refraction index, namely producing a three-dimensional periodic structure, the periodically arranged elements of which have dimensions and distances with respect to each other that are smaller than the wavelength $\lambda$ of the illuminating light. Such three-dimensional periodic structures may, for example, be so-called photonic crystals or optical structures behaving like a photonic crystal, according to embodiments. In the following, such structures will generally be referred to as photonic crystals.

Photonic crystals include structured semiconductors, glasses or polymers and force light to propagate in the manner needed for a device function in the medium, by means of their specific structure. They are periodic dielectric and/or metallic structures, the period lengths of which are adjusted so that they influence the propagation of electromagnetic waves in a similar way, as the periodic potential in semiconductor crystals does with respect to the propagation of electrons.

Figure 6A:
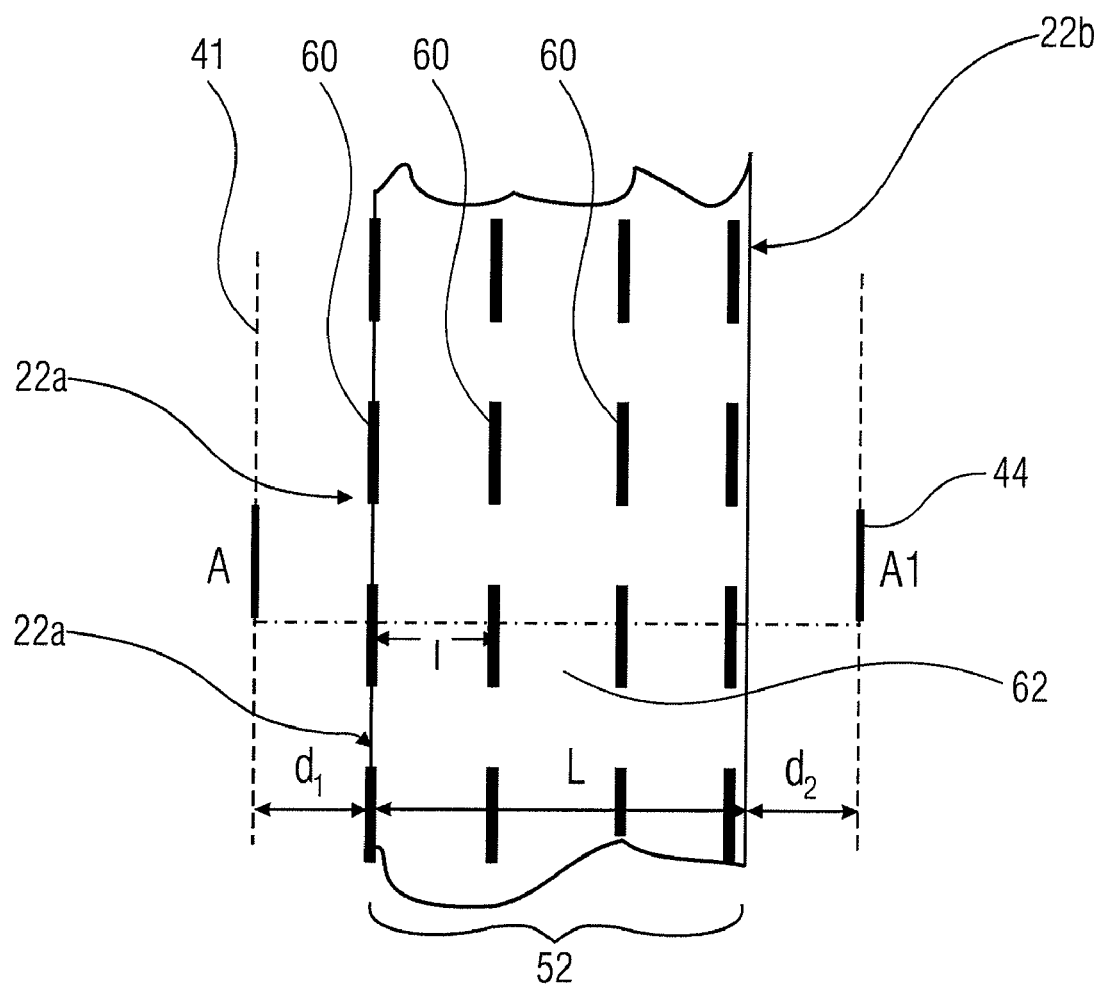
Figure 6B:
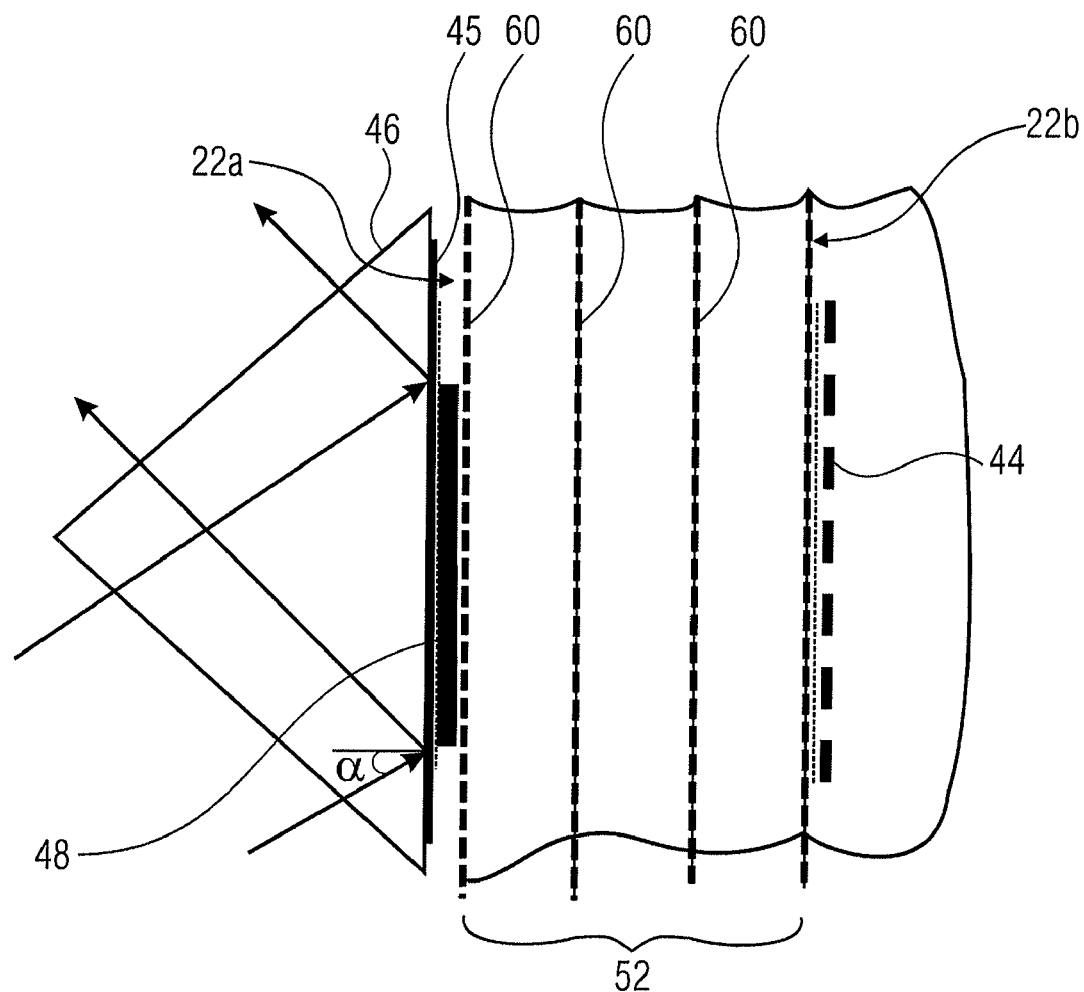
FIGS. 6b and 6c show variations of FIG. 6a according to FIGS. 4b and 4c, respectively.
Figure 6C:
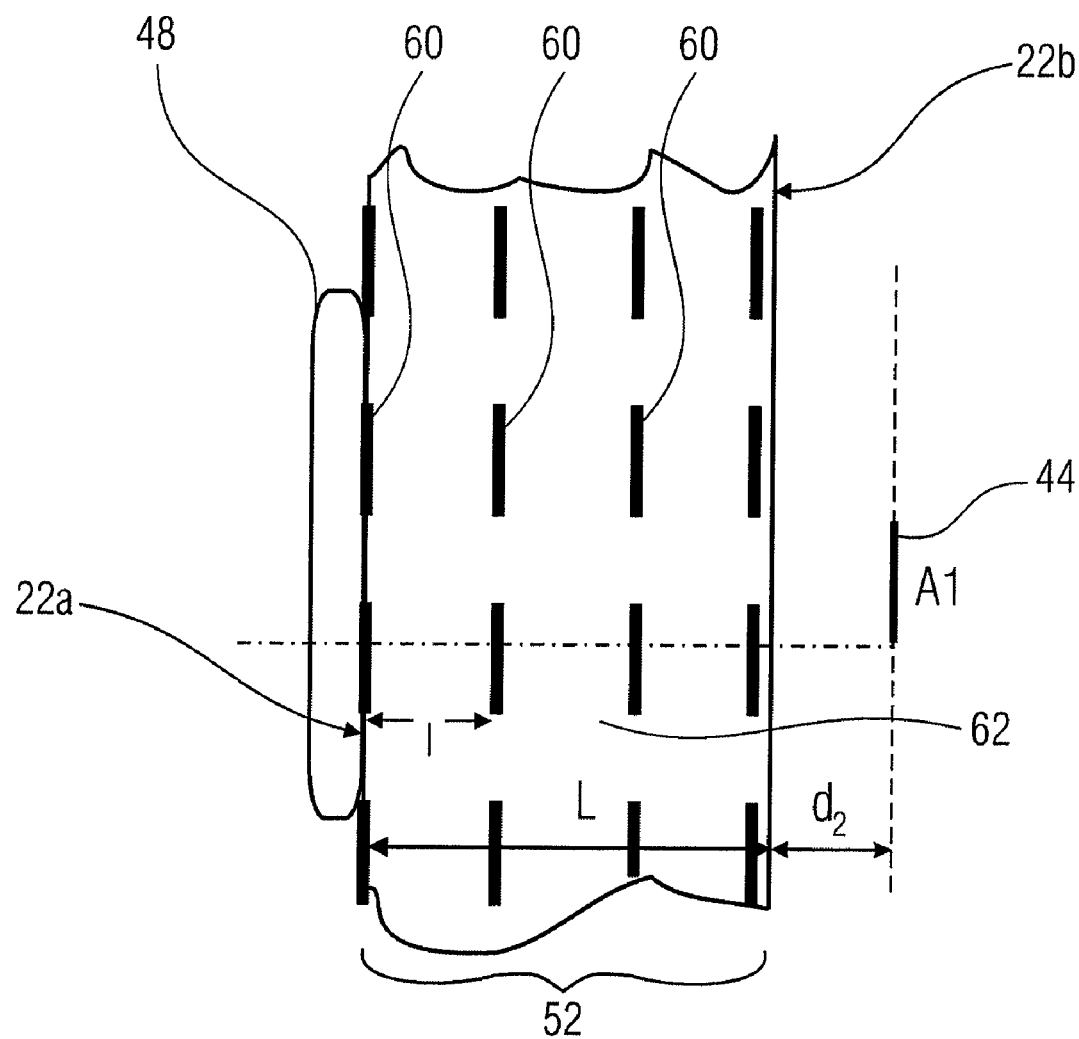

An optical structure 52 virtually behaving like a photonic crystal is shown in FIG. 6a.

The optical structure 52 shown in FIG. 6a with a negative refractive index includes periodically arranged metal layers 60 in a dielectric medium 62, such as $SiO_2$. The metal layers 60, for example, comprise microopenings, such as indicated in the side view of the optical structure 52 in FIG. 6a. The geometrical shape of these microopenings may be designed diversely and depends on the desired electromagnetic properties of the optical structure 52. For example, circular microopenings, the dimensions and distances of which with respect to each other are on the order of the illumination wavelength $\lambda$, and/or smaller than the illumination wave $\lambda$, are possible. A distance 1 between adjacent metal layers 60 is also on the order of the illumination wavelength $\lambda$ and/or is smaller than the same.

For example, so as to transport an evanescent field originating from the object plane 41 and impinging on the first side or developing at the first side from the first side 22a of the optical structure 52 to the second side 22b of the optical structure 52, the first side 22a is also placed at a near-field distance $d_1$ smaller than the illumination wavelength $\lambda$ from the object plane 41 here. The image plane 44, in which the pixel array 24 is placed, extends at a distance $d_2$ smaller than the illumination wave $\lambda$ from the second side 22b also in the embodiments of the optical structure 52 shown in FIG. 6a.

In the embodiment shown in FIG. 6a, the field strength course of the evanescent field results in a similar way as has already been described previously on the basis of FIG. 4a. This means that an evanescent field impinging on the first side 22a is amplified by the optical structure 22 and/or the photonic crystal 52 with a negative refractive index upon the transmission by the optical structure 22 toward the second side 22b thereof. This effect of the amplification of near-field waves is described in C. Lou et. al, "Subwavelength imaging in photonic chrystals", for example.

Similar to FIGS. 4a-4c, FIGS. 6b and 6c show further evanescent field generation possibilities in connection with a photonic crystal. Regarding more details, reference is made to the description of FIGS. 4b and 4c.

Figure 7:
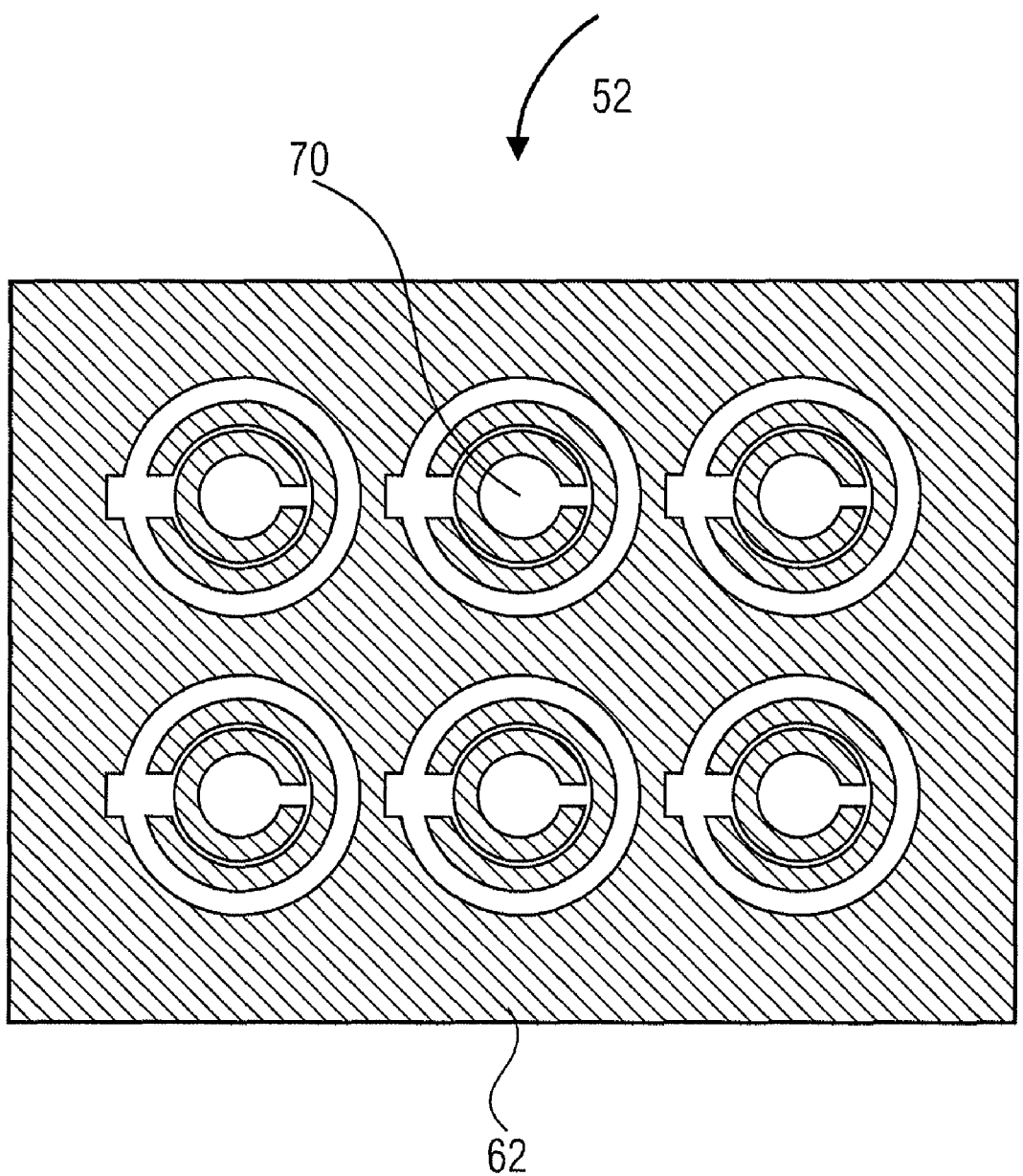
FIG. 7 is a top view onto a metal layer with split-ring resonators according to an embodiment of the present invention.

FIG. 7 shows one possible embodiment of microelements realized in the metal layers 60.

FIG. 7 can be regarded as a top view onto the optical structure 52 with a negative refractive index. In metal layers, microelements 70 (illustrated in white) are introduced into a dielectric medium 62 (illustrated in black). Here, FIG. 7 exemplarily shows a portion with six periodically arranged microelements 70, which comprise a so-called split-ring resonator structure. Thus, FIG. 7 shows a top view of a possible form of realization of the various layers 60 with metallic microelements 70 shown in side view in FIG. 6a. The dimensions of the microelements 70 here are clearly smaller than the illumination wavelength λ. If one changes the ratio of the radii of the outer and inner circles of a split-ring resonator 70, the corresponding resonator wavelength changes. It is to be pointed out that other structures are also possible, such as so-called LC-loaded transmission lines, it being important that overall transmission is as high as possible.

Summarizing, FIG. 8 shows an integrated image sensor 80 realized in CMOS technology and resulting by use of an optical structure 52 described on the basis of FIGS. 6 and 7, which shall not be described in more detail here, since it only differs from the image sensor described on the basis of FIG. 5, in construction, by the left-handed material 52 used.

Image sensors on the basis of the previously described left-handed materials (metamaterials and three-dimensional photonic crystals) can be realized with CMOS processes, such as a CMOS opto-process, without necessitating additional process steps or further processings.

A method of producing an integrated image sensor on a substrate, according to embodiments, includes a step of producing a photodiode array 24 on a substrate surface of the substrate and applying an optical structure with a negative refractive index onto the photodiode array, so that the photodiode array extends along the optical structure at a predefined distance $d_2$, wherein producing and applying are parts of a CMOS process.

According to embodiments, applying the optical structure includes applying a layer stack of at least one dielectric layer and a metal layer, wherein the at least one metal layer comprises microstructures having dimensions and distances between two adjacent microstructures that allow for transmission of an evanescent field through the optical structure.

Figure 9:
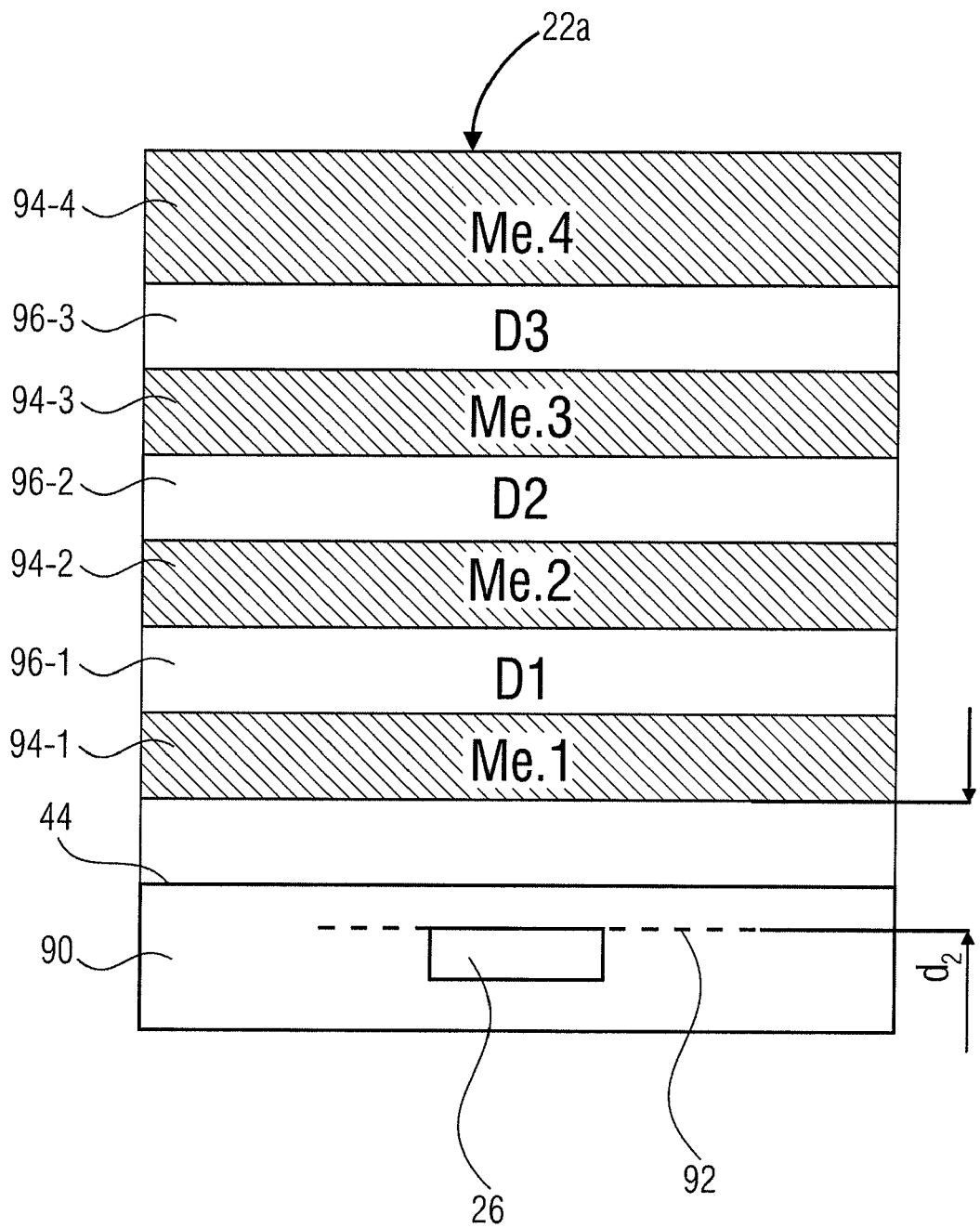
FIG. 9 is a side view of a layer stack fabricated with CMOS technology of a pixel array, metal layers and dielectric layers, according to an embodiment of the present invention.

An intermediate product of a CMOS production process of an image sensor according to embodiments is schematically shown in FIG. 9.

The integrated image sensor shown in FIG. 9, which is not finished yet, includes a substrate 90, particularly a semiconductor substrate, in which a photodiode array 24 is introduced, wherein FIG. 9 only exemplarily shows a photodiodes 26 of the photodiode array 24. Here, the photodiodes 26 are arranged in a plane 92, which corresponds to the image plane 44 or at least passes very closely to the image plane 44.

The unfinished optical structure in FIG. 9 comprises a layer stack of metallic layers 94 and dielectric layers 96. FIG. 9 only exemplarily shows four metal layers 94-1 to 94-4 and three dielectric layers 96-1 to 96-3. Depending on the embodiment, the number of layers may deviate from the example shown in FIG. 9.

In the case of a metamaterial with a metal layer on the first side 22a and an ensuing layer stack of three dielectric layers, only the metal layer 94-4 thus will remain, and the unnecessary metal layers 94-1 to 94-3 will be removed completely within the framework of the CMOS process. Additionally, the upper metal layer 94-4 is also provided with the described microopenings. In connection with the three remaining dielectric layers 96-1 to 96-3, which have corresponding dielectric constants $\in_r$, a left-handed material, particularly a metamaterial, with a negative refractive index develops, as has already been described previously on the basis of FIGS. 3 to 5.

On the other hand, in current CMOS processes, there is the possibility of also structuring the lower-lying metal layers 94-1 to 94-3 in so fine a manner that microstructures and/or microelements resulting therefrom are arranged periodically and are smaller than the illumination wavelength λ. This allows for creating three-dimensional periodic structures with properties of photonic crystals directly on a chip. As already described previously, the individual microelements or microstructures of the structured metal layers are smaller than the illumination wavelength λ, so that a three-dimensional photonic crystal acting as the left-handed material develops.

In all previously described embodiments, the photodiode area 24 is placed very closely to the last layer 94-1 of the structure, with the distance $d_2$ being smaller than the illumination wavelength λ. Every single photodiode 26 then only registers a corresponding portion of the evanescent field of the object to be examined, and a two-dimensional image of the object (not shown in FIG. 9) develops in connection with signal processing, like in conventional imaging sensors.

Schematic views of image sensors realized by way of CMOS processes, having left-handed optical structures and pixel arrays, according to embodiments, have already been explained on the basis of FIGS. 3, 5 and FIG. 8.

After having explained production and construction of image sensors according to embodiments of the present invention in detail in the foregoing, possible applications of image sensors according to embodiments will be explained in the following on the basis of FIGS. 10 and 11.

Figure 10:
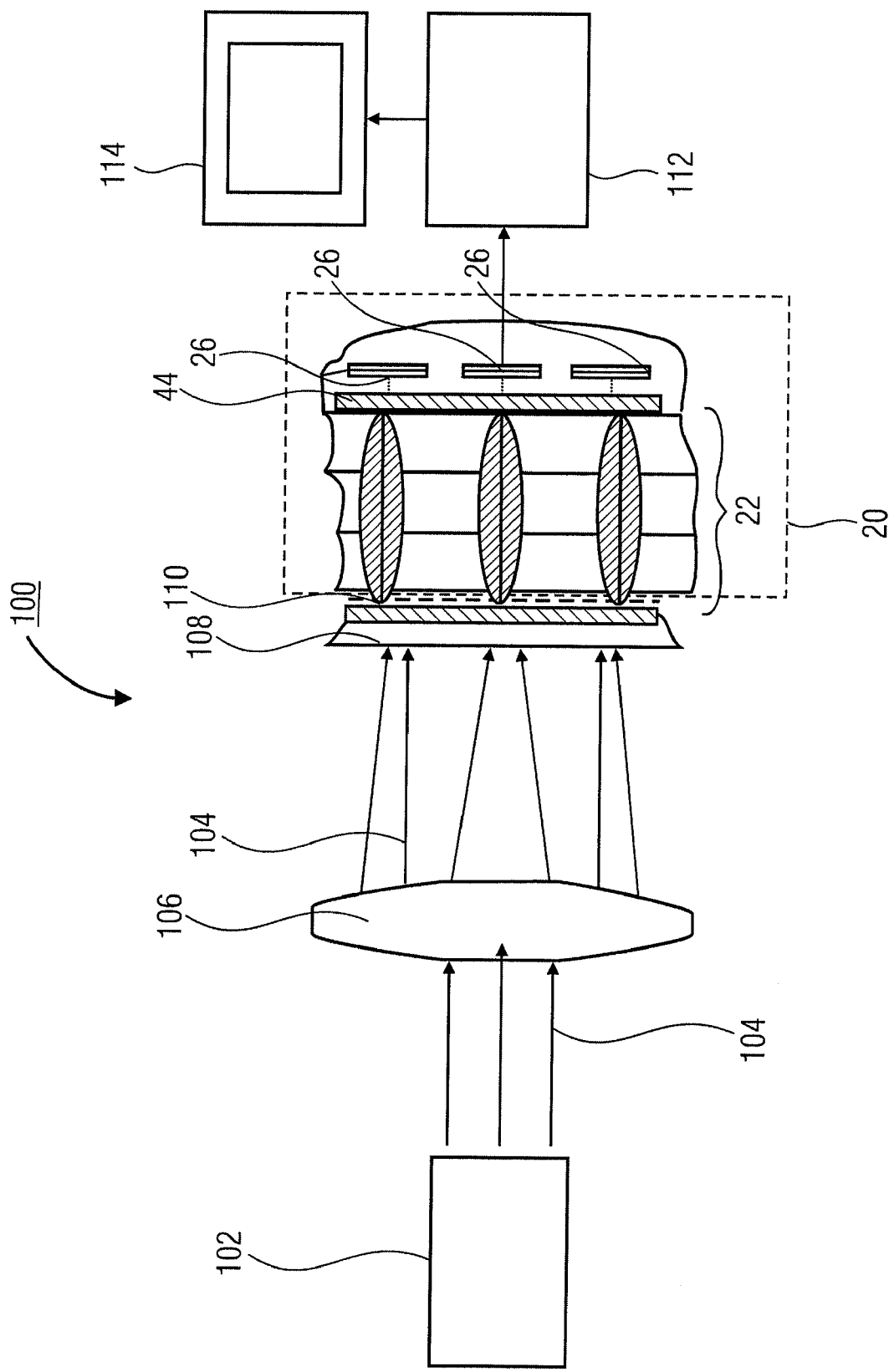
FIG. 10 is a schematic illustration of a microscope with an image sensor according to an embodiment of the present invention.

FIG. 10 shows a microscope 100, which is a sub-wavelength microscope or near-field microscope, in particular, according to an embodiment of the present invention.

Monochromatic light 104 originating from a monochromatic light source 102 passes through an optical system 106, such as a condenser, and then illuminates an object carrier 108 with a structure to be examined and/or an object 110 to be examined. At a near-field distance $d_1$ smaller than the wavelength λ of the monochromatic light 104, an integrated image sensor 20 is arranged according to embodiments. Alternatively, the sample 110 may also be in contact with a front side of the image sensor 20.

The image sensor 20 is coupled to an image processing system 112, which, in turn, is connected to output means 114, such as a monitor. The left-handed optical structure 22 included by the image sensor 20, which may be a metamaterial or a photonic crystal, transmits the evanescent field, which originates from the object 110 to be examined or is dependent on the object 110 to be examined and develops on the front side of the sensor 20, to the second side or backside of the optical structure 22 or in the image plane, without clipping high spatial frequencies or space frequencies. The photodiode array 24 is at a distance $d_2$ of less than a wavelength λ with respect to the image plane 44 and/or the second side 22b of the optical structure, so as to keep losses due to the quickly decaying evanescent field as low as possible. The image processing system 112 processes and digitizes the signal of every single photodiode 26 detected by the photodiode array and generates an image for the attached monitor 114.

As opposed to conventional near-field microscopes, which scan measurement objects only point-by-point with a very fine probe, a sub-wavelength microscope with an image sensor according to embodiments of the present invention has the advantage that the entire image of the objects to be examined can be detected and converted to an electric video signal. Furthermore, also moving objects, such as bacterial cultures, or the like, can be examined by means of an image sensor according to embodiments. Moving image detection is not possible when illuminating a film-like layer or when scanning an object.

A further application of an image sensor according to embodiments consists in an improvement of a resolution of diffraction-limited objectives. To this end, embodiments of the present invention provide an optical apparatus with an objective, an optical structure with a negative refractive index, wherein a first side of the optical structure is arranged in an image plane of the diffraction-limited optics, and a pixel array, which extends at a predetermined distance along a second side opposite to the first side of the optical structure. The objective here is adjusted to a remote object plane at a distance of, for example, more than five focal lengths, for example.

Figure 11A:
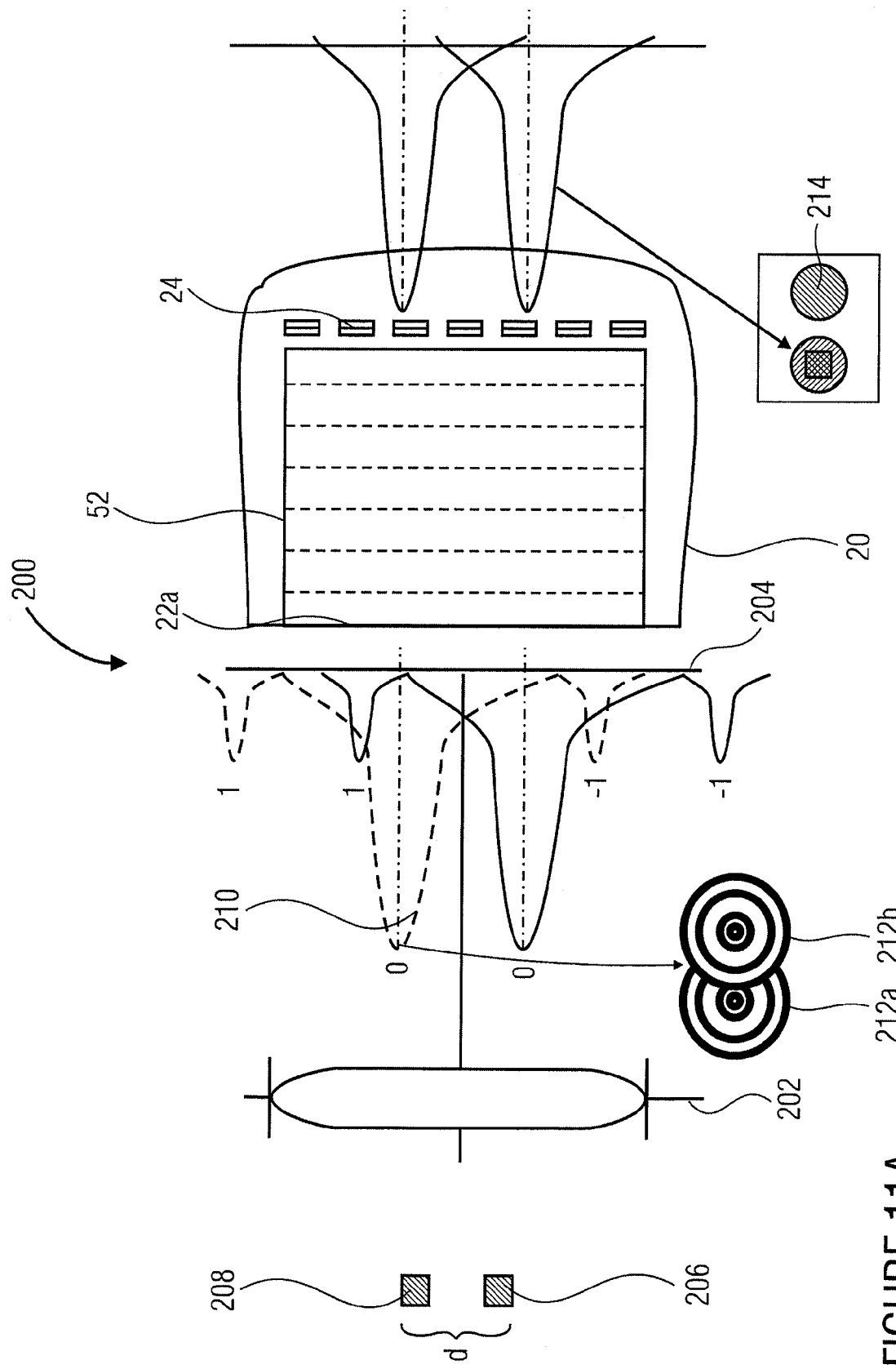
FIG. 11a is a schematic illustration of an optical apparatus with a diffraction-limited objective and an image sensor according to an embodiment of the present invention.
Figure 11B:
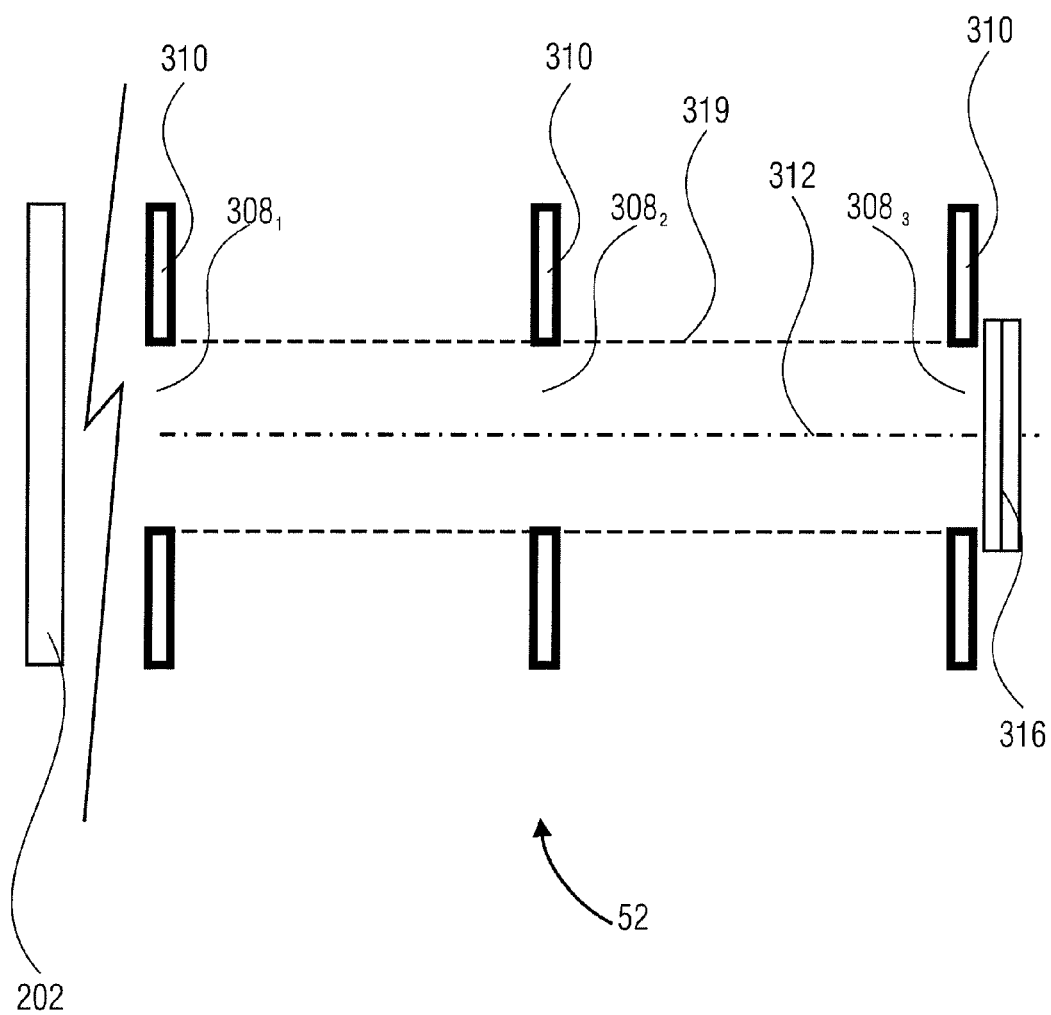
Figure 12:
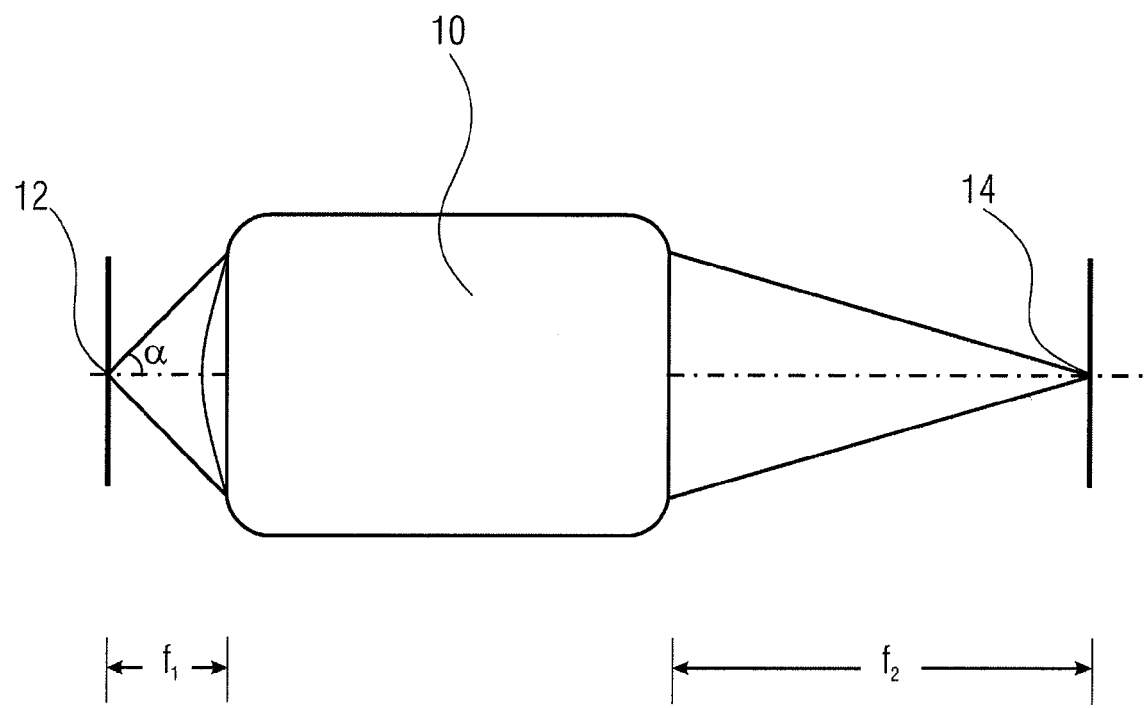
FIG. 12 is a schematic illustration of conventional diffraction-limited optics.

Such an optical apparatus 200 is shown schematically in FIG. 11a.

The optical apparatus 200 includes a diffraction-limited objective 202 with an image plane 204. The first side 22a of a left-handed optical structure 22 is arranged in the image plane 204 of the objective 202. At a predefined distance $d_2$ from the second side 22b of the optical structure 22, there is a pixel array 24, specifically a photodiode array. According to an embodiment, the optical structure with a negative refractive index is a photonic crystal and/or a three-dimensional structured structure behaving like a photonic crystal, as described previously on the basis of FIGS. 6-8.

Conventional optical systems have a limited resolution of about half a wavelength, which is due to diffraction at the objective 202 and/or the diameter of the entrance pupil of the system. The Rayleigh criterion exactly defines the resolution limit for an objective when viewing a black and white periodic line structure. The minimum distance d of two still-resolvable lines is then defined so that the maximum of the diffractive image of a first gap coincides with a first minimum of the diffractive image of a second adjacent gap. For two points 206, 208 in infinity lying closely together with respect to a viewing angle, such as two fixed stars, this means that a light intensity distribution 210 in the image plane 204 of the objective 202 does not allow for resolving the two objects, since corresponding diffractive images or diffractive slices 212a,b overlap strongly. A diffractive image of each object point consists of several diffractive orders (k=0, k=±1, k=±2, etc.) with minima and maxima, as schematically shown in FIG. 11a, so that corresponding diffractive slices 212a,b develop.

With the aid of an image sensor 20 with a photonic crystal according to embodiments and a photodiode array 24, the possibility arises to decrease diffractive proportions of the light originating from the object points 206, 208, in the imaging onto the photodiode array by the photonic crystal, so that a light proportion of higher diffraction orders (k=±1, k=±2, etc.) becomes very small. Photonic crystals are strongly selective with respect to the angle of incidence of light. The microelements of the photonic crystal 52 transmit light only in very narrow solid-angle ranges and strongly attenuate diffractive light originating from other directions. This may be explained as follows, wherein reference is made to FIG. 11b, which shows part of the image part of FIG. 11a, namely a part beyond the image plane, i.e. in the photonic crystal, and there only a part limited laterally to a superlens opening. The openings 308 of the metal layers of the optical structure each have an opening diameter generally corresponding to a maximum opening expansion of an arbitrarily shaped opening 308. With circular openings, the opening diameter thus corresponds to a diameter of the circle, with a rectangular opening to a diagonal of the rectangle, etc. According to embodiments, the openings 308 of neighboring metal layers 310 may be arranged so as to be offset laterally with respect to each other by less than the opening diameter, in order to achieve solid-angle selectivity of the optical structure. Like in the case of FIG. 6, the openings 308 in the metal layers 310 of the photonic crystals are on a common axis 312, which may be parallel to the optical axis of the system of FIG. 11a and further passes through a pixel, such as a photodiode, 316 of the sensor 24. The openings 308 together form a sub-wavelength waveguide 319, which achieves the previously mentioned strong solid-angle selectivity, and which transmits the evanescent field developing at the input-side opening 308-1 to the pixel 316. Through the sub-wavelength waveguide properties and/or through the strong angle selectivity of the sub-wavelength waveguide 319, diffractive proportions of the transmitted light are suppressed, so that no spurious diffractive light impinges on the sensor 24 and/or on the pixel 316. In this way, the sensor 24 "sees" the image of the diffraction-limited objective 202 through a kind of "tube array" 52 with tubes 319, without the spurious diffractive effects.

After the optical filtering by the photonic crystal 52, hence, it is possible to still resolve two neighboring light sources 206, 208 the distance d of which lies below the Rayleigh criterion, since the light field filtered by the photonic crystal 52 has a smaller proportion of diffractive light than the light directly behind the diffraction-limited objective 202. The photodiode array 24 registers the evanescent field, which contains less spurious diffractive light than the field directly behind the objective 202. Hence, only the $0^{th}$ diffractive order of the incident light, for example, can be registered by the pixel array 24, as indicated by reference numeral 214, since higher diffractive orders have been filtered out by the optical crystal 52.

In summary, the present invention thus deals with image sensors constructed as an optoelectric hybrid structure and including a left-handed material. This left-handed material may, for example, be formed by a metamaterial or a three-dimensional photonic crystal, with both consisting of microstructured metal layers and dielectric layers with defined dielectric constants $\in_r$ as well as a photodiode array, in sandwich form. Both, image sensors with a metamaterial and image sensors with a photonic crystal may be produced integrally in CMOS technology, without necessitating additional process steps. An image sensor constructed according to embodiments works with a monochromatic light source with an illumination wavelength $\lambda$ that may have a resolution better than $\lambda/10$.

The evanescent field, which is a weak field and the intensity of which decreases exponentially with the distance from the illuminated object, can be detected immediately and without losses by the photodiode array downstream of the left-handed material, since the distance between the mapping plane or second side of the left-handed material and the photodiode array is smaller than the illumination wavelength $\lambda$, according to embodiments.

When using an image sensor according to embodiments together with a diffraction-limited objective in a telescope-like application, it is possible to achieve a resolution enhancement based on separation and/or suppression of the spurious proportion of the diffractive light, due to the filtering of the evanescent field from the far field by the left-handed material.

In the art of (near field) microscopy, no conventional optics is required for imaging an object. A combination of structured metal layers, dielectric layers and a photodiode array allows for a hybrid element capable of resolving structures smaller than $\lambda/10$. Point-wise scanning of the examined object is not necessary.

Finally, it is to be pointed out that the present invention is not limited to the components respectively described or the procures explained, since these components and methods may vary. The terms used here are only meant to describe particular embodiments and are not used in a limiting sense. When the singular or indefinite articles are used in the description and in the claims, these also refer to the plurality of these elements, unless clearly dictated otherwise in the overall context. The same applies vice-versa.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A microscope with sub-wavelength resolution comprising:
a light source for monochromatic light with a predetermined wavelength;
an object carrier for an object to be examined; and
an image sensor comprising
an optical structure with a first side and a second side opposite to the first side, the optical structure comprising a negative refractive index; and
a pixel array extending along the second side of the optical structure at a predetermined distance,
wherein the first side of the optical structure of the image sensor is arranged at a near-field distance smaller than the wavelength of the monochromatic light to the object carrier.

2. The microscope according to claim 1, wherein the optical structure is formed to transmit an evanescent field from the first side to the second side of the optical structure.

3. The microscope according to claim 1, wherein the optical structure comprises a metamaterial.

4. The microscope according to claim 3, wherein the metamaterial comprises a layer stack of dielectric layers and a metal layer with microapertures, with dimensions of the microapertures and distances between neighboring microapertures comprising orders of magnitude so that an evanescent field on the first side can be transmitted to the second side.

5. The microscope according to claim 4, wherein the dimensions and distances are smaller than 1.2 µm.

6. The microscope according to claim 1, wherein the optical structure comprises a photonic crystal.

7. The microscope according to claim 6, wherein the photonic crystal is formed by a three-dimensional periodic structure, which comprises microelements the distances and dimensions of which comprise an order of magnitude so that an evanescent field on the first side can be transmitted to the second side.

8. The microscope according to claim 7, wherein the three-dimensional, periodically arranged microelements are formed as split-ring resonators.

9. The microscope according to claim 1, wherein the pixel array comprises an array of PN junction sensors.

10. The microscope according to claim 1, wherein the pixel array is a photodiode array.

11. The microscope according to claim 1, wherein the predetermined distance of the pixel array to the second side is adjusted so that an evanescent field transmitted from the first side to the second side and exiting the second side can be detected by the pixel array.

12. The microscope according to claim 11, wherein the predetermined distance is smaller than 1.2 µM.

13. A method of forming an image of an object, comprising:
illuminating the object, with a first side of an optical structure with a negative refractive index arranged at least at a near-field distance to the object, so that an evanescent field on the first side, which is modulated by the object, is transmitted to a second side of the optical structure opposite to the first side; and
detecting the evanescent field on the second side by a pixel array.

14. The method according to claim 13, wherein the object is illuminated by monochromatic light.

15. The method according to claim 13, wherein the first side of the optical structure is arranged at a distance smaller than 1.2 µm from the object.

16. The method according to claim 13, wherein the pixel array is arranged at a predetermined distance along the second side, wherein the predetermined distance of the pixel array from the second side is adjusted so that an evanescent field transmitted from the first side to the second side and exiting from the second side can be detected by the pixel array.

17. The method according to claim 16, wherein the predefined distance is smaller than 1.2 µm.

18. An optical apparatus for improving resolution of diffraction-limited optics, comprising:
diffraction-limited optics;
an optical structure with a negative refractive index, wherein a first side of the optical structure is arranged in an image plane of the diffraction-limited optics, and wherein the optical structure comprises neighboring metal layers with openings, wherein the openings comprise an opening expansion, and wherein a lateral offset of the openings of neighboring metal layers is smaller than the opening expansion, to achieve solid-angle selectivity of the optical structure; and
a pixel array extending at a predetermined distance along a second side of the optical structure opposite the first side.

19. The optical apparatus according to claim 18, wherein the openings of adjacent metal layers are on a common axis to achieve solid-angle selectivity of the optical structure.

* * * * *